(12) United States Patent
Fan et al.

(10) Patent No.: US 11,974,071 B2
(45) Date of Patent: Apr. 30, 2024

(54) DYNAMIC FRAME RATE ADJUSTMENT MECHANISM

(71) Applicant: MEDIATEK INC., Hsin-Chu (TW)

(72) Inventors: Kang-Yi Fan, Hsinchu (TW);
Chin-Wen Liang, Hsinchu (TW);
Chang-Chu Liu, Hsinchu (TW);
Sheng-Hsiang Chang, Hsinchu (TW);
You-Min Yeh, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/892,117

(22) Filed: Aug. 21, 2022

(65) Prior Publication Data
US 2022/0408054 A1 Dec. 22, 2022

Related U.S. Application Data

(63) Continuation of application No. 17/153,892, filed on Jan. 21, 2021, now Pat. No. 11,457,173.

(60) Provisional application No. 62/979,476, filed on Feb. 21, 2020.

(51) Int. Cl.
*H04N 7/01* (2006.01)
(52) U.S. Cl.
CPC .................................. *H04N 7/013* (2013.01)
(58) Field of Classification Search
None
See application file for complete search history.

(56) References Cited

U.S. PATENT DOCUMENTS

| 9,905,199 B2 | 2/2018 | Liu et al. |
| 10,380,968 B2 | 8/2019 | Zhang et al. |
| 2013/0057763 A1* | 3/2013 | Cha .......................... G09G 5/12 348/554 |
| 2014/0306969 A1 | 10/2014 | Tang |

(Continued)

FOREIGN PATENT DOCUMENTS

| CN | 103823546 A | 5/2014 |
| CN | 106557710 A | 4/2017 |
| CN | 108184065 A | 6/2018 |

(Continued)

OTHER PUBLICATIONS

MIPI Alliance Standard for Display Serial Interface V1.0, MIPI Board approved Apr. 5, 2006, Version 1.00a-19 Apr. 2006, pp. 1-80, 2006 MIPI Alliance Inc., XP002677191 ,Apr. 2006.

*Primary Examiner* — Samira Monshi
(74) *Attorney, Agent, or Firm* — Winston Hsu

(57) ABSTRACT

The present invention provides a control method of a processor, wherein the control method comprises the steps of: transmitting image data of a first frame to an integrated circuit, wherein the first frame corresponds to a first frame rate; determining a second frame rate of a second frame next to the first frame; determining if a difference between the second frame rate and the first frame rate belongs to a large scale frame rate adjustment or a small scale frame rate adjustment; if the difference between the second frame rate and the first frame rate belongs to the large scale frame rate adjustment, using a first mode to transmit image data of the second frame; and if the difference between the second frame rate and the first frame rate belongs to the small scale frame rate adjustment, using a second mode to transmit image data of the second frame.

13 Claims, 11 Drawing Sheets

(56) References Cited

U.S. PATENT DOCUMENTS

2015/0170323 A1   6/2015  Choi
2016/0366398 A1  12/2016  Chen

FOREIGN PATENT DOCUMENTS

| CN | 108431724 A    | 8/2018  |
|----|----------------|---------|
| CN | 108762465 A    | 11/2018 |
| TW | I492210 B      | 7/2015  |
| TW | I657432 B      | 4/2019  |
| TW | I678695 B      | 12/2019 |
| WO | 2018/082213 A1 | 5/2018  |
| WO | 2019/124908 A1 | 6/2019  |

* cited by examiner

DYNAMIC FRAME RATE ADJUSTMENT MECHANISM

CROSS REFERENCE TO RELATED APPLICATION

This application is a continuation application of U.S. application Ser. No. 17/153,892, filed on Jan. 21, 2021, which claims the benefit of U.S. Provisional Application No. 62/979,476, filed on Feb. 21, 2020. The contents of these applications are incorporated herein by reference.

BACKGROUND

In the field of graphics and multimedia, frame rate generally refers to the rate at which frames of visual content are provided by a graphics engine. Different types of visual content may have varying frame rates, and the frame rates may change as different content types are displayed, for example, the frame rate may be adjusted with a large scale (e.g., from 60 Hz to 90 Hz) when a film material on a television is switched to a video game, and the frame rate may be adjusted with a lower scale (e.g., from 90 Hz to 88 Hz) due to an output of the graphics engine. The conventional arts generally use only one mechanism to control a data transmission when the frame rate is varied, however, to all of the major dynamic frame rate adjustment methods, there is no solution which can achieve dynamic adjustment in high frame rate and efficient power consumption in low frame rate at the same time.

SUMMARY

It is therefore an objective of the present invention to provide a dynamic frame adjustment method, which can use different control methods to control the data transmission when the frame rate is changed, to solve the above-mentioned problems.

According to one embodiment of the present invention, a control method of a processor comprises the steps of: transmitting image data of a first frame to an integrated circuit, wherein the first frame corresponds to a first frame rate; determining a second frame rate of a second frame next to the first frame; determining if a difference between the second frame rate and the first frame rate belongs to a large scale frame rate adjustment or a small scale frame rate adjustment; if it is determined that the difference between the second frame rate and the first frame rate belongs to the large scale frame rate adjustment, using a first mode to transmit image data of the second frame; and if it is determined that the difference between the second frame rate and the first frame rate belongs to the small scale frame rate adjustment, using a second mode to transmit image data of the second frame.

According to another embodiment of the present invention, a processor is configured to perform the steps of: transmitting image data of a first frame to an integrated circuit, wherein the first frame corresponds to a first frame rate; determining a second frame rate of a second frame next to the first frame; determining if a difference between the second frame rate and the first frame rate belongs to a large scale frame rate adjustment or a small scale frame rate adjustment; if it is determined that the difference between the second frame rate and the first frame rate belongs to the large scale frame rate adjustment, using a first mode to transmit image data of the second frame; and if it is determined that the difference between the second frame rate and the first frame rate belongs to the small scale frame rate adjustment, using a second mode to transmit image data of the second frame.

According to another embodiment of the present invention, a control method of a processor comprises the steps of: receiving a first synchronization signal from an integrated circuit; transmitting image data of a first frame to the integrated circuit in response to the first synchronization signal, wherein the first frame corresponds to a first frame rate; receiving a second synchronization signal from the integrated circuit; determining if a second frame rate of a second frame next to the first frame is lower than the first frame rate; if the second frame rate is lower than the first frame rate, dividing image data of the second frame into a plurality parts; and transmitting the plurality parts to the integrated circuit discontinuously.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
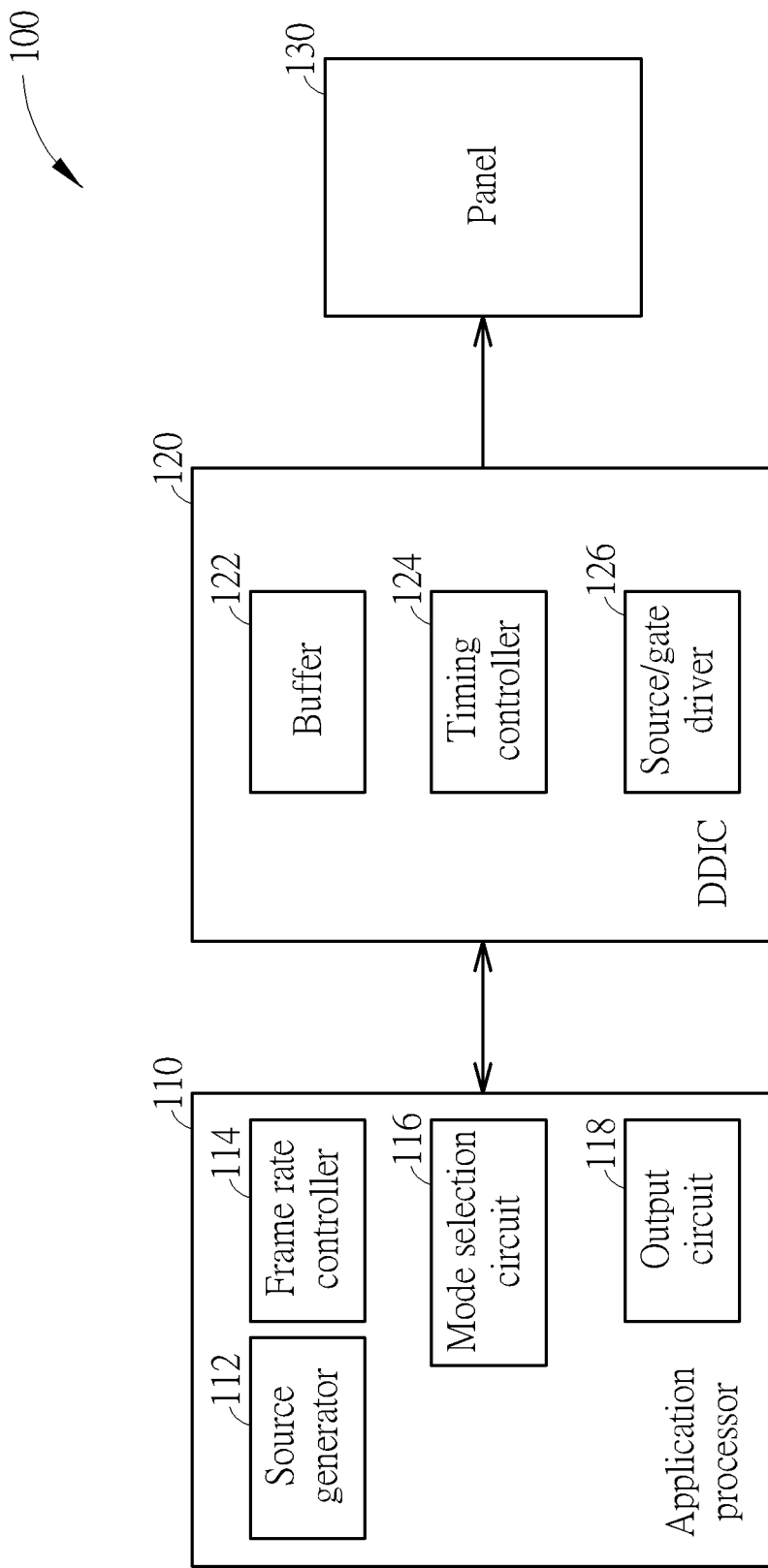
FIG. 1 is a diagram illustrating an electronic device 100 according to one embodiment of the present invention.

FIG. 1 is a diagram illustrating an electronic device 100 according to one embodiment of the present invention. As shown in FIG. 1, the electronic device 100 comprises an application processor (AP) 110, a display driver integrated circuit (DDIC) 120 and a panel 130. The AP 110 comprises a source generator 112, a frame rate controller 114, a mode selection circuit 116 and an output circuit 118, wherein the source generator 112 may be implemented by one or more hardware or software modules to create image data, the frame rate controller 114 is configured to control a frame rate of the image data that are sent to the DDIC 120, the mode selection circuit 116 is configured to select a mode that is used when the frame rate is changed, and the output circuit 118 is configured to output the image data to the DDIC 120. The DDIC 120 may comprise a buffer 122, a timing controller 124 and a source/gate driver 126, wherein the buffer 122 is configured to temporarily store image data from the AP 110, the timing controller 124 receives the image data and control signals from the AP 110 to control the source/gate driver 126 to apply corresponding driving voltages to the panel 130.

Because the present invention focuses on the frame rate adjustment and associated mode selection, the following disclosure merely describes the operations of the frame rate controller 114 and the mode selection circuit 116, and the detailed descriptions of the other components are omitted here.

Figure 2:
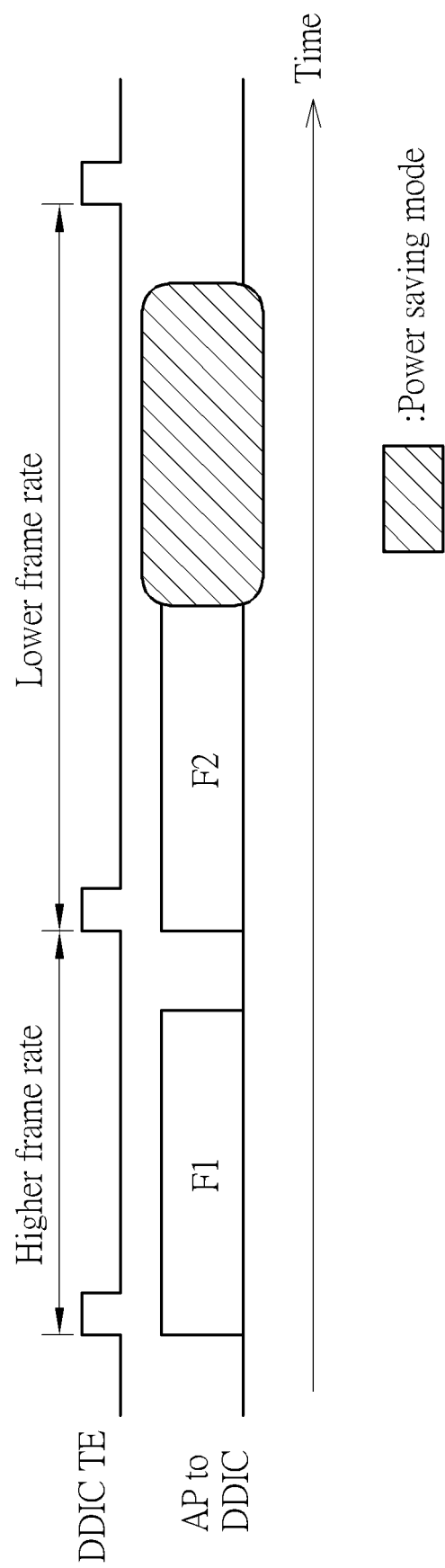
FIG. 2 shows a first command mode of the data transmission according to one embodiment of the present invention.

The AP 110 can operate in several modes for the data transmission when the frame rate is changed. FIG. 2 shows a first command mode of the data transmission according to one embodiment of the present invention. As shown in FIG. 2, when the frame rate is changed (e.g., from a higher frame rate to a lower frame rate), the data (image data) is transmitted at the same speed, and part circuits (e.g., interface circuit) within the AP 110 may enter the power saving mode at the remaining time. Specifically, initially the frame rate controller 114 determines a higher frame rate, and after receiving a TE signal (i.e., a synchronization signal) from the DDIC 120, the output circuit 118 writes the image data of a frame F1 into the buffer 122 of the DDIC 120, then the timing controller 124 reads the image data of the frame F1 from the buffer 122 to drive the source/gate driver 126. Then, if the frame rate controller 114 determines that a next frame F2 is adjusted to have a lower frame rate, after receiving a TE signal from the DDIC 120, the output circuit 118 writes the image data of a frame F2 into the buffer 122 of the DDIC 120 with the same or similar speed, then the timing controller 124 reads the image data of the frame F2 from the buffer 122 to drive the source/gate driver 126. In this embodiment, the TE signal may be transmitted by a TE pin defined by a Mobile Industry Processor Interface (MIPI) specification.

Figure 3:
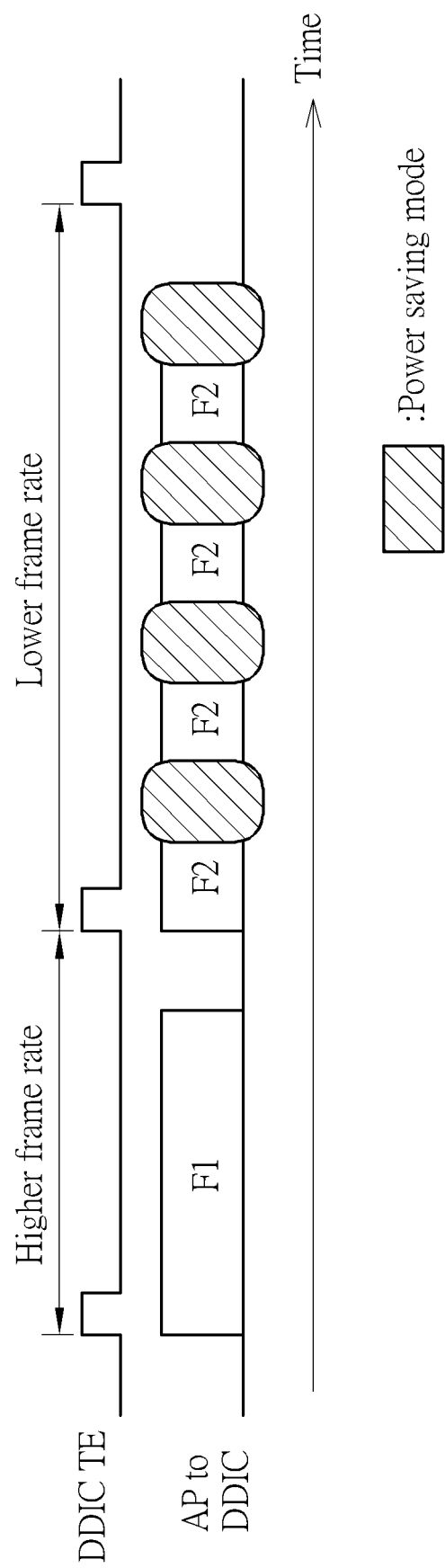
FIG. 3 shows a second command mode of the data transmission according to one embodiment of the present invention.

FIG. 3 shows a second command mode of the data transmission according to one embodiment of the present invention. As shown in FIG. 3, when the frame rate is changed (e.g., from a higher frame rate to a lower frame rate), the image data is divided into several parts, and the several parts are discontinuously sent to the DDIC 120. Specifically, initially the frame rate controller 114 determines a higher frame rate, and after receiving a TE signal from the DDIC 120, the output circuit 118 writes the image data of a frame F1 into the buffer 122 of the DDIC 120, then the timing controller 124 reads the image data of the frame F1 from the buffer 122 to drive the source/gate driver 126. Then, if the frame rate controller 114 determines that a next frame F2 is adjusted to have a lower frame rate, after receiving a TE signal from the DDIC 120, the output circuit 118 divides image data of a frame F2 into several parts, and several parts are written into the buffer 122 of the DDIC 120, wherein part of the AP 110 operates in a power saving mode between the transmission of two parts of the image data. Then, the timing controller 124 reads the image data of the frame F2 from the buffer 122 to drive the source/gate driver 126.

Figure 4:
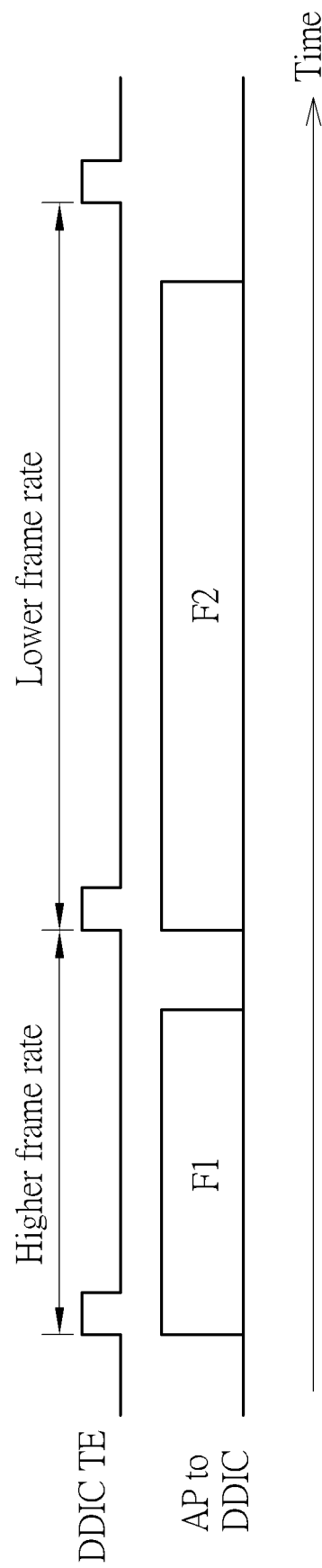
FIG. 4 shows a third command mode of the data transmission according to one embodiment of the present invention.

FIG. 4 shows a third command mode of the data transmission according to one embodiment of the present invention. As shown in FIG. 4, when the frame rate is changed (e.g., from a higher frame rate to a lower frame rate), the output circuit 118 sends the image data with lower speed. Specifically, initially the frame rate controller 114 determines a higher frame rate, and after receiving a TE signal from the DDIC 120, the output circuit 118 writes the image data of a frame F1 into the buffer 122 of the DDIC 120, then the timing controller 124 reads the image data of the frame F1 from the buffer 122 to drive the source/gate driver 126. Then, if the frame rate controller 114 determines that a next frame F2 is adjusted to have a lower frame rate, after receiving a TE signal from the DDIC 120, the output circuit 118 writes the image data of a frame F2 into the buffer 122 of the DDIC 120 with lower speed, then the timing controller 124 reads the image data of the frame F2 from the buffer 122 to drive the source/gate driver 126. For example, a clock frequency used for the transmission of the frame F1 and the frame F2 may be different, that is the output circuit 118 uses a higher clock frequency to transmit the image data of the frame F1, and uses a lower clock frequency to transmit the image data of the frame F2.

Figure 5:
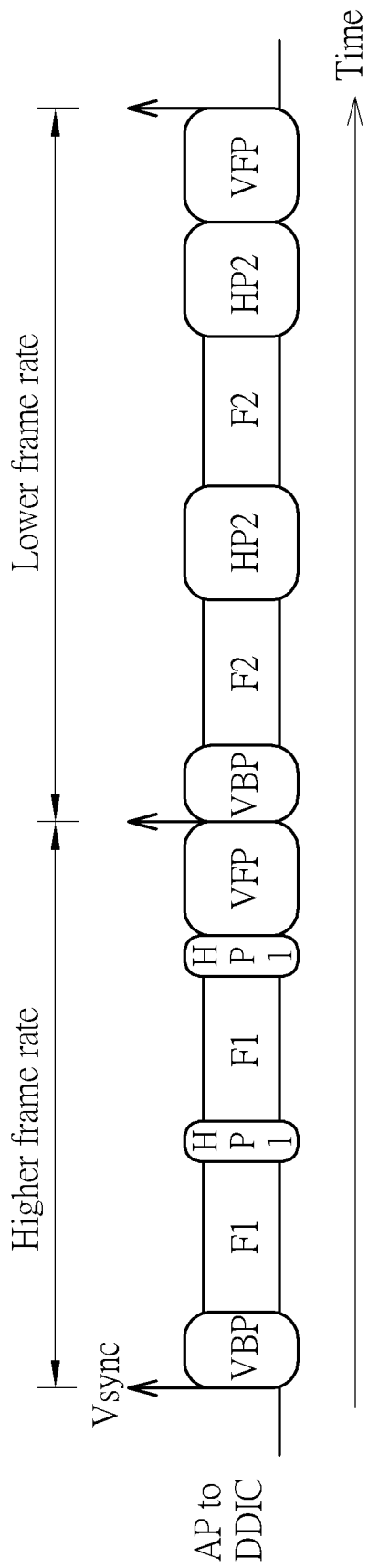
FIG. 5 shows a first video mode of the data transmission according to one embodiment of the present invention.

FIG. 5 shows a first video mode of the data transmission according to one embodiment of the present invention. As shown in FIG. 5, when the frame rate is changed (e.g., from a higher frame rate to a lower frame rate), the output circuit 118 increases a length of a horizontal porch. Specifically, initially the frame rate controller 114 determines a higher frame rate, and the output circuit 118 transmits the image data of a frame F1 with a vertical synchronization signal Vsync to the DDIC 120, wherein the image data comprises a vertical back porch (VBP), active image data (i.e., image data that will be displayed on a screen) with horizontal porch, and a vertical front porch (VFP). It is noted that there should be many horizontal porches in FIG. 5, but FIG. 5 only shows two horizontal porches HP1 for simplicity. Then, if the frame rate controller 114 determines that a next frame F2 is adjusted to have a lower frame rate, the output circuit 118 transmits the image data of the frame F2 with a vertical synchronization signal Vsync to the DDIC 120, wherein the image data of the frame F2 comprises a vertical back porch, active image data with large horizontal porch, and a vertical front porch. In this embodiment, the length of the horizontal porch HP2 of the frame F2 is greater than the length of the horizontal porch HP1 of the frame F1, for example, the output circuit 118 may increase the horizontal porch HP2 of the frame F2.

Figure 6:
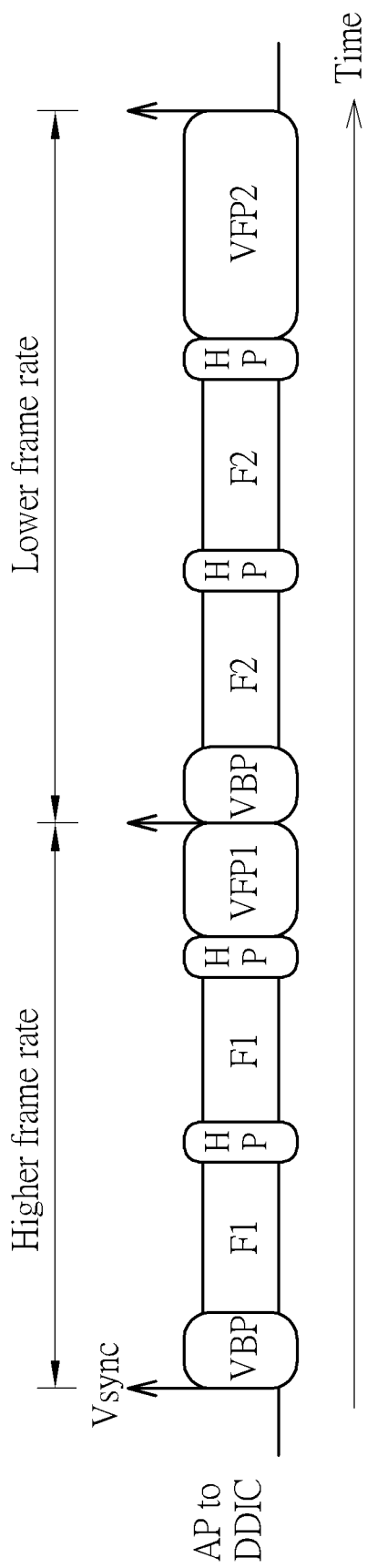
FIG. 6 shows a second video mode of the data transmission according to one embodiment of the present invention.

FIG. 6 shows a second video mode of the data transmission according to one embodiment of the present invention. As shown in FIG. 6, when the frame rate is changed (e.g., from a higher frame rate to a lower frame rate), the output circuit 118 increases a length of a vertical front porch. Specifically, initially the frame rate controller 114 determines a higher frame rate, and the output circuit 118 transmits the image data of a frame F1 with a vertical synchronization signal Vsync to the DDIC 120, wherein the image data comprises a vertical back porch (VBP), active image data with horizontal porch, and a vertical front porch (VFP). It is noted that there should be many horizontal porches in FIG. 6, but FIG. 6 only shows two horizontal porches HPs for simplicity. Then, if the frame rate controller 114 determines that a next frame F2 is adjusted to have a lower frame rate, the output circuit 118 transmits the image data of the frame F2 with a vertical synchronization signal Vsync to the DDIC 120, wherein the image data of the frame F2 comprises a vertical back porch, active image data with horizontal porch, and a larger vertical front porch. In this embodiment, the length of the vertical front porch VFP2 of the frame F2 is greater than the length of the vertical front porch VFP1 of the frame F1, for example, the output circuit 118 may increase the vertical front porch VFP2 of the frame F2.

Figure 7:
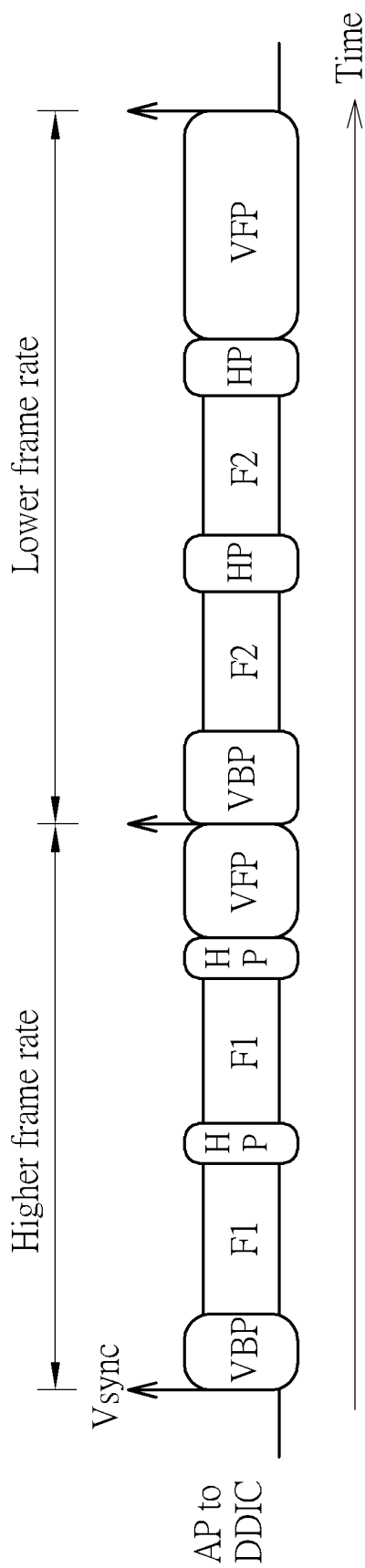
FIG. 7 shows a third video mode of the data transmission according to one embodiment of the present invention.

FIG. 7 shows a third video mode of the data transmission according to one embodiment of the present invention. As shown in FIG. 7, when the frame rate is changed (e.g., from a higher frame rate to a lower frame rate), the output circuit 118 sends the image data with lower speed. Specifically, initially the frame rate controller 114 determines a higher frame rate, and the output circuit 118 transmits the image data of a frame F1 with a vertical synchronization signal Vsync to the DDIC 120, wherein the image data comprises a vertical back porch (VBP), active image data with horizontal porch, and a vertical front porch (VFP). Then, if the frame rate controller 114 determines that a next frame F2 is adjusted to have a lower frame rate, the output circuit 118 transmits the image data of the frame F2 with lower speed to the DDIC 120, wherein the image data of the frame F2 comprises a vertical back porch, active image data with horizontal porch, and a vertical front porch. In this embodiment, a clock frequency used for the transmission of the frame F1 and the frame F2 may be different, that is the output circuit 118 uses a higher clock frequency to transmit the image data of the frame F1, and uses a lower clock frequency to transmit the image data of the frame F2.

Figure 8:
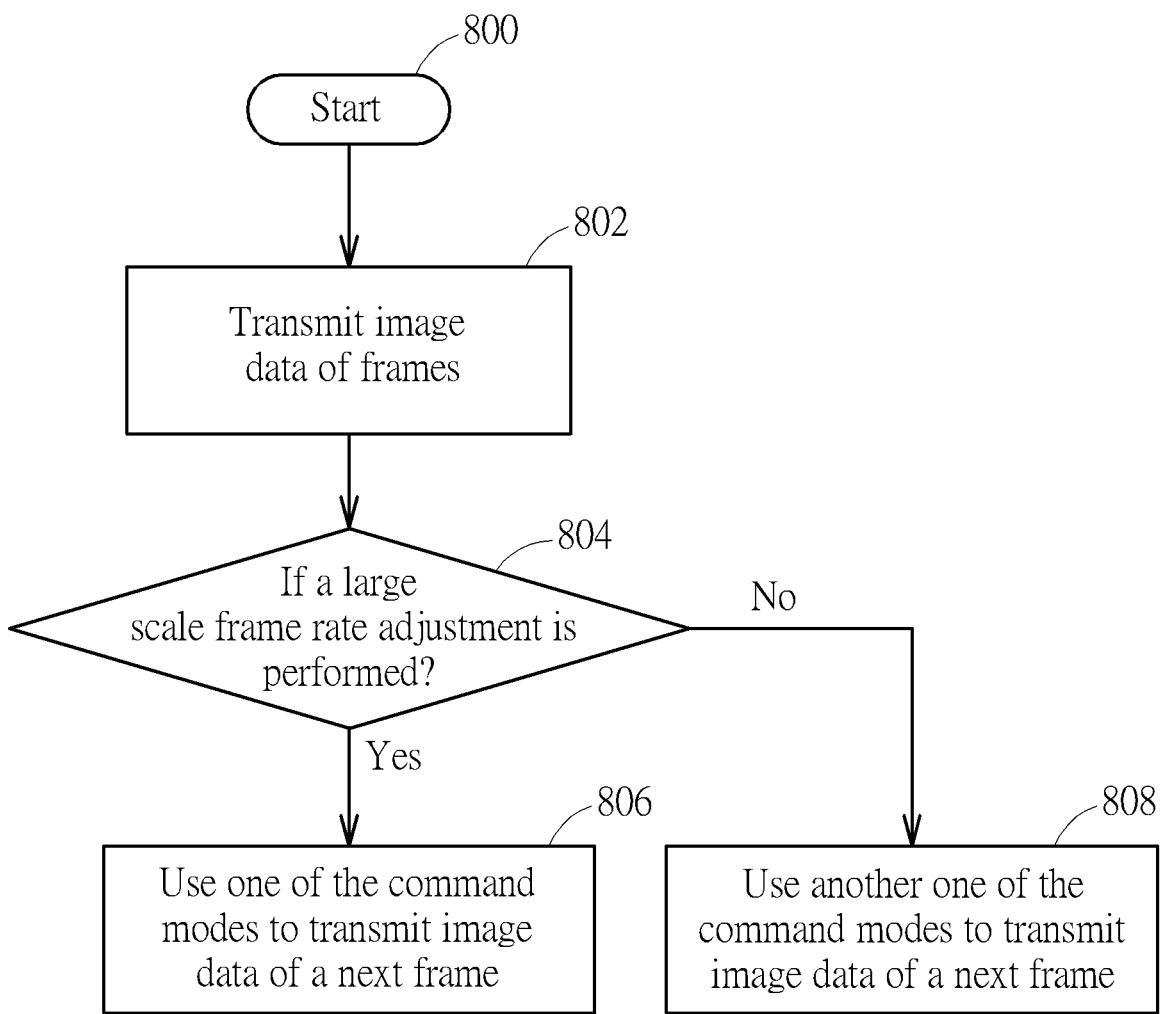
FIG. 8 is a flowchart of a control method of data transmission according to one embodiment of the present invention.

FIG. 8 is a flowchart of a control method of data transmission according to one embodiment of the present invention. In Step 800, the flow starts, and the electronic device 100 is powered on. In Step 802, the processor 110 transmits image data of frames to the DDIC 120. In Step 804, the frame rate controller 114 determines if a large scale frame rate adjustment is performed, if yes, the flow enters Step 806; and if not, the flow enters Step 808. In one embodiment, the frame rate controller 114 may use a threshold value to determine if the frame rate adjustment belongs to large scale adjustment or not. For example, if the frame rate is adjusted from 60 Hz to 90 Hz when a film material on a television is switched to a video game, the frame rate adjustment is determined as large scale adjustment; and if the frame rate is adjusted 90 Hz to 88 Hz due to an output speed of the source generator 112, the frame rate adjustment is determined as small scale adjustment. In Step 806, the mode selection circuit 116 selects one of the command modes, and the output circuit 118 transmits the image data with the adjusted frame rate to the DDIC 120 by using the selected command mode. In Step 808, the mode selection circuit 116 selects another one of the command modes, and the output circuit 118 transmits the image data with the adjusted frame rate to the DDIC 120 by using the selected command mode. For example, not a limitation of the present invention, the second command mode shown in FIG. 3 or the third command mode shown in FIG. 4 can be selected for the large scale frame rate adjustment (Step 806), and the first command mode shown in FIG. 2 can be selected for the small scale frame rate adjustment (Step 808).

Figure 9:
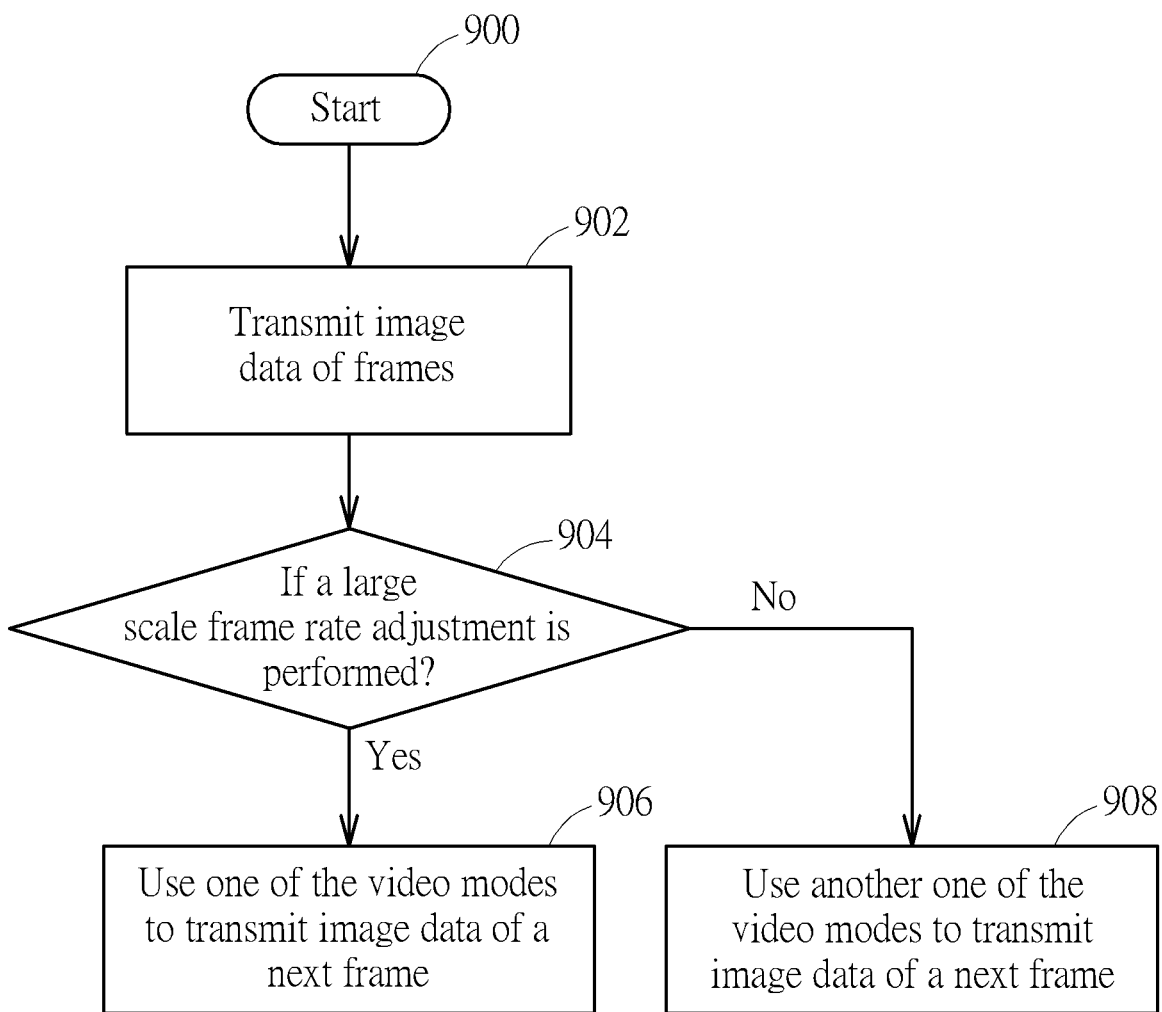
FIG. 9 is a flowchart of a control method of data transmission according to another embodiment of the present invention.

FIG. 9 is a flowchart of a control method of data transmission according to one embodiment of the present invention. In Step 900, the flow starts, and the electronic device 100 is powered on. In Step 902, the processor 110 transmits image data of frames to the DDIC 120. In Step 904, the frame rate controller 114 determines if a large scale frame rate adjustment is performed, if yes, the flow enters Step 906; and if not, the flow enters Step 908. In one embodiment, the frame rate controller 114 may use a threshold value to determine if the frame rate adjustment belongs to large scale adjustment or not. For example, if the frame rate is adjusted from 60 Hz to 90 Hz when a film material on a television is switched to a video game, the frame rate adjustment is determined as large scale adjustment; and if the frame rate is adjusted 90 Hz to 88 Hz due to an output speed of the source generator 112, the frame rate adjustment is determined as small scale adjustment. In Step 906, the mode selection circuit 116 selects one of the video modes, and the output circuit 118 transmits the image data with the adjusted frame rate to the DDIC 120 by using the selected video mode. In Step 908, the mode selection circuit 116 selects another one of the video modes, and the output circuit 118 transmits the image data with the adjusted frame rate to the DDIC 120 by using the selected video mode. For example, not a limitation of the present invention, the first video mode shown in FIG. 5 can be selected for the large scale frame rate adjustment (Step 906), and the second video mode shown in FIG. 6 can be selected for the small scale frame rate adjustment (Step 908).

Figure 10:
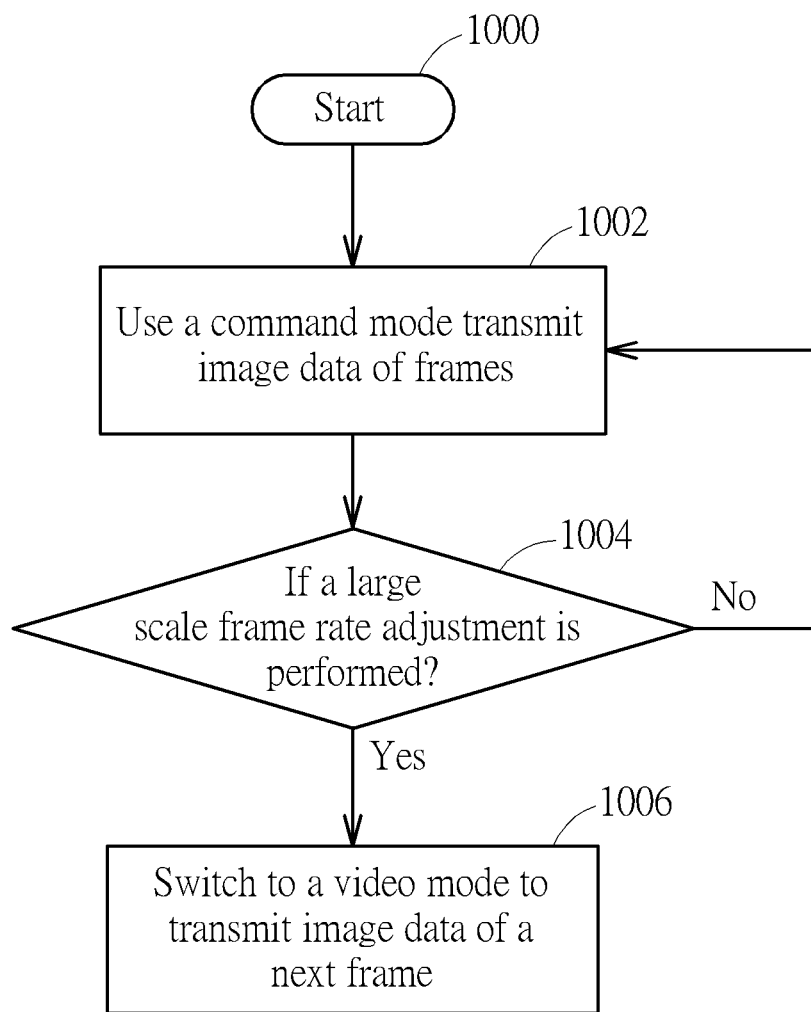
FIG. 10 is a flowchart of a control method of data transmission according to another embodiment of the present invention.

FIG. 10 is a flowchart of a control method of data transmission according to one embodiment of the present invention. In Step 1000, the flow starts, and the electronic device 100 is powered on. In Step 1002, the mode selection circuit 116 selects a command mode such as the first command mode shown in FIG. 2, the second command mode shown in FIG. 3 or the third command mode shown in FIG. 4, and the processor 110 transmits image data of frames to the DDIC 120 based on the selected command mode. In Step 1004, the frame rate controller 114 determines if a large scale frame rate adjustment is performed, if yes, the flow enters Step 1006; and if not, the flow goes back to Step 1002. In one embodiment, the frame rate controller 114 may use a threshold value to determine if the frame rate adjustment belongs to large scale adjustment or not. For example, if the frame rate is adjusted from 60 Hz to 90 Hz when a film material on a television is switched to a video game, the frame rate adjustment is determined as large scale adjustment; and if the frame rate is adjusted 90 Hz to 88 Hz due to an output speed of the source generator 112, the frame rate adjustment is determined as small scale adjustment. In Step 1006, the mode selection circuit 116 switches the command mode to a video mode to transmit image data of a next frame with large scale frame rate adjustment, wherein the video mode may be the first video mode shown in FIG. 5, the second video mode shown in FIG. 6 or the third video mode shown in FIG. 7. In addition, after the image data of the next frame is successfully transmitted, the flow may go back to Step 1002, that is mode selection circuit 116 switches to the command mode to transmit the image data of the following frames; or after the image data of the next frame is successfully transmitted, the mode selection circuit 116 still uses the video mode to transmit the image data of the following frames.

Figure 11:
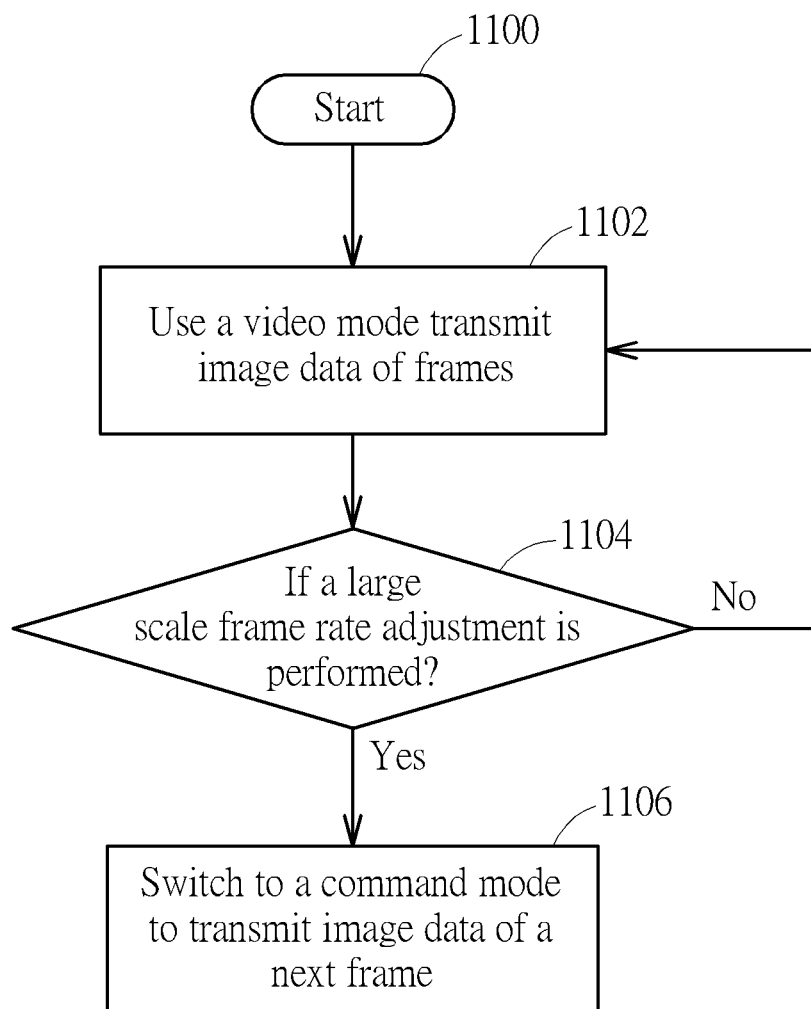
FIG. 11 is a flowchart of a control method of data transmission according to another embodiment of the present invention.

FIG. 11 is a flowchart of a control method of data transmission according to one embodiment of the present invention. In Step 1100, the flow starts, and the electronic device 100 is powered on. In Step 1102, the mode selection circuit 116 selects a video mode such as the first video mode shown in FIG. 5, the second video mode shown in FIG. 6 or the third video mode shown in FIG. 7, and the processor 110 transmits image data of frames to the DDIC 120 based on the selected command mode. In Step 1104, the frame rate controller 114 determines if a large scale frame rate adjustment is performed, if yes, the flow enters Step 1106; and if not, the flow goes back to Step 1102. In one embodiment, the frame rate controller 114 may use a threshold value to determine if the frame rate adjustment belongs to large scale adjustment or not. For example, if the frame rate is adjusted from 60 Hz to 90 Hz when a film material on a television is switched to a video game, the frame rate adjustment is determined as large scale adjustment; and if the frame rate is adjusted 90 Hz to 88 Hz due to an output speed of the source generator 112, the frame rate adjustment is determined as small scale adjustment. In Step 1006, the mode selection circuit 116 switches to a command mode from the video mode to transmit image data of a next frame with large scale frame rate adjustment, wherein the command mode may be the first command mode shown in FIG. 2, the second command mode shown in FIG. 3 or the third command mode shown in FIG. 4. In addition, after the image data of the next frame is successfully transmitted, the flow may go back to Step 1102, that is mode selection circuit 116 switches to the video mode to transmit the image data of the following frames; or after the image data of the next frame is successfully transmitted, the mode selection circuit 116 still uses the command mode to transmit the image data of the following frames.

Briefly summarized, in the control method of the present invention, by selecting different modes (command modes or video modes) for the large scale frame rate adjustment and small scale frame rate adjustment, the processor can use the appropriate mode in different conditions to satisfy some requirements such as efficiency or power saving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a processor, comprising:
   receiving a first synchronization signal from an integrated circuit;
   writing image data of a first frame into the integrated circuit in response to the first synchronization signal, wherein the first frame corresponds to a first frame rate;
   receiving a second synchronization signal from the integrated circuit;
   determining if a second frame rate of a second frame next to the first frame is lower than the first frame rate; and
   in response to the second frame rate being lower than the first frame rate, writing image data of the second frame to the integrated circuit in response to the second synchronization signal, wherein a speed of writing the image data of the second frame from the processor to the integrated circuit is substantially the same as a speed of writing the image data of the first frame from the processor to the integrated circuit.

2. The control method of claim 1, further comprising:
   after writing image data of the second frame to the integrated circuit, controlling part circuits within the processor into a power saving mode.

3. A control method of a processor, comprising:
   receiving a first synchronization signal from an integrated circuit;
   writing image data of a first frame into the integrated circuit in response to the first synchronization signal, wherein the first frame corresponds to a first frame rate;
   receiving a second synchronization signal from the integrated circuit;
   determining if a second frame rate of a second frame next to the first frame is lower than the first frame rate; and
   in response to the second frame rate being lower than the first frame rate, writing image data of the second frame to the integrated circuit in response to the second synchronization signal, wherein a speed of writing the image data of the second frame from the processor to the integrated circuit is lower than a speed of writing the image data of the first frame from the processor to the integrated circuit.

4. The control method of claim 3, wherein the step of writing the image data of the first frame into the integrated circuit is using a first transmission rate, and the step of writing the image data of the second frame into the integrated circuit is using a second transmission rate lower than the first transmission rate.

5. A control method of a processor, comprising:
   transmitting active image data with a first vertical back porch, a plurality of first horizontal porches and a first vertical front porch of a first frame to an integrated circuit, wherein the first frame corresponds to a first frame rate;
   determining if a second frame rate of a second frame next to the first frame is lower than the first frame rate; and
   in response to the second frame rate being lower than the first frame rate, transmitting active image data with a second vertical back porch, a plurality of second horizontal porches and a second vertical front porch of the second frame to the integrated circuit, wherein a length of each of the plurality of second horizontal porches is greater than a length of each of the plurality of first horizontal porches.

6. A control method of a processor, comprising:
   transmitting active image data with a first vertical back porch, a plurality of first horizontal porches and a first vertical front porch of a first frame to an integrated circuit, wherein the first frame corresponds to a first frame rate;
   determining if a second frame rate of a second frame next to the first frame is lower than the first frame rate; and
   in response to the second frame rate being lower than the first frame rate, transmitting active image data with a second vertical back porch, a plurality of second horizontal porches and a second vertical front porch of the second frame to the integrated circuit, wherein a length of the second vertical back porch is greater than a length of the first vertical back porch.

7. A control method of a processor, comprising:
   transmitting active image data with a first vertical back porch, a plurality of first horizontal porches and a first vertical front porch of a first frame to an integrated circuit, wherein the first frame corresponds to a first frame rate;
   determining if a second frame rate of a second frame next to the first frame is lower than the first frame rate; and
   in response to the second frame rate being lower than the first frame rate, transmitting active image data with a second vertical back porch, a plurality of second horizontal porches and a second vertical front porch of the second frame to the integrated circuit; and wherein a speed of transmitting the active image data of the second frame with the second vertical back porch, the plurality of second horizontal porches and the second vertical front porch is lower than a speed of transmitting the active image data of a first frame with the first vertical back porch, the plurality of first horizontal porches and the first vertical front porch.

8. The control method of claim 7, wherein the step of transmitting the active image data of a first frame with the first vertical back porch, the plurality of first horizontal porches and the first vertical front porch is using a first transmission rate, and the step of transmitting the active image data of the second frame with the second vertical back porch, the plurality of second horizontal porches and the second vertical front porch is using a second transmission rate lower than the first transmission rate.

9. A control method of a processor, comprising:
transmitting image data of a first frame to an integrated circuit, wherein the first frame corresponds to a first frame rate;
determining a second frame rate of a second frame next to the first frame;
determining if a difference between the second frame rate and the first frame rate belongs to a large scale frame rate adjustment or a small scale frame rate adjustment;
in response to the difference between the second frame rate and the first frame rate being belonging to the large scale frame rate adjustment, using a first command mode to transmit image data of the second frame to an integrated circuit in response to a synchronization signal received from the integrated circuit; and
in response to the difference between the second frame rate and the first frame rate being belonging to the small scale frame rate adjustment, using a second command mode different from the first command mode to transmit the image data of the second frame to the integrated circuit in response to the synchronization signal received from the integrated circuit.

10. The control method of claim 9, wherein a speed of transmitting the image data of the second frame using the first command mode is different from a speed of transmitting the image data of the second frame using the second command mode.

11. A control method of a processor, comprising:
transmitting image data of a first frame to an integrated circuit, wherein the first frame corresponds to a first frame rate;
determining a second frame rate of a second frame next to the first frame;
determining if a difference between the second frame rate and the first frame rate belongs to a large scale frame rate adjustment or a small scale frame rate adjustment;
in response to the difference between the second frame rate and the first frame rate being belonging to the large scale frame rate adjustment, using a first video mode to transmit active image data with a vertical back porch, a plurality of horizontal porches and a vertical front porch of a second frame to an integrated circuit; and
in response to the difference between the second frame rate and the first frame rate being belonging to the small scale frame rate adjustment, using a second video mode different from the first video mode to transmit the active image data with the vertical back porch, the plurality of horizontal porches and the vertical front porch of the second frame to the integrated circuit.

12. The control method of claim 11, wherein a length of the plurality of horizontal porches, a length of the vertical front porch or a transmission rate corresponding the first video mode is different from a length of the plurality of horizontal porches, a length of the vertical front porch or a transmission rate corresponding the second video mode.

13. A control method of a processor, comprising:
transmitting image data of a first frame to an integrated circuit, wherein the first frame corresponds to a first frame rate;
determining a second frame rate of a second frame next to the first frame;
determining if a difference between the second frame rate and the first frame rate belongs to a large scale frame rate adjustment or a small scale frame rate adjustment;
in response to the difference between the second frame rate and the first frame rate being belonging to the large scale frame rate adjustment, using a first mode to transmit image data of the second frame to an integrated circuit; and
in response to the difference between the second frame rate and the first frame rate being belonging to the small scale frame rate adjustment, using a second mode to transmit image data of the second frame to the integrated circuit;
wherein the first mode is a command mode, and the second mode is a video mode; or the first mode is the video mode, and the second mode is the command mode;
wherein the command mode is transmitting the image data of the second frame in response to a synchronization signal received from the integrated circuit, and the video mode is transmit active image data with a vertical back porch, a plurality of horizontal porches and a vertical front porch of the second frame to the integrated circuit.

\* \* \* \* \*